United States Patent Office 3,169,350
Patented Feb. 16, 1965

3,169,350
MACHINE FOR FORMING LENSES AND
SIMILAR ARTICLES
Gareld M. Corman, San Francisco, Calif., assignor to
Gilbert Alm, Chico, Calif.
Filed July 25, 1963, Ser. No. 297,505
4 Claims. (Cl. 51—67)

This invention relates to a machine for forming lenses and similar articles and more particularly to a machine adapted to form aspherical lenses or any other type of lens wherein the contour deviates from a true spherical or conic surface.

Heretofore there have been many attempts made to provide machines having the accuracy required in lens grinding and which machines are adapted to automatically grind aspheric surfaces. Generally, such machines take the form of a grinding and feeding apparatus wherein a template formed to the desired curvature is provided. A follower engages the template and is connected by an articulated mechanism to the tool holder so as to reproduce on the work the identical surface defined by the template. Such devices have several disadvantages. The main disadvantage being the loss in time required in setting up the template to the exact curvature required. This procedure is particularly difficult in those instances wherein relatively abrupt changes in the contour of the lens are desired for eliminating spherical aberation and for other reasons because of the limitations involved in bending the template.

One of the main objects of the present invention is the provision of a machine which is adapted to employ a preformed template adapted to be used in forming surfaces of revolution of different profiles. By employing a preformed accurately machined template for various profiles it is not necessary that a great deal of care be exercised on each set-up thereby saving the time required in changing from one profile to another.

Another object of the invention is the provision of a lens grinding machine that employs a conical surface as a template thereby permitting the formation of lenses of any conic surface including spherical.

Another object of the invention is the provision of a lens grinding machine wherein the template is a conical surface and means is provided for swinging said surface during the lens forming operation so as to form surfaces that are close to but slightly off true conic surfaces.

Other objects and advantages will be apparent from the following specification and from the drawings, wherein.

Figure 1:
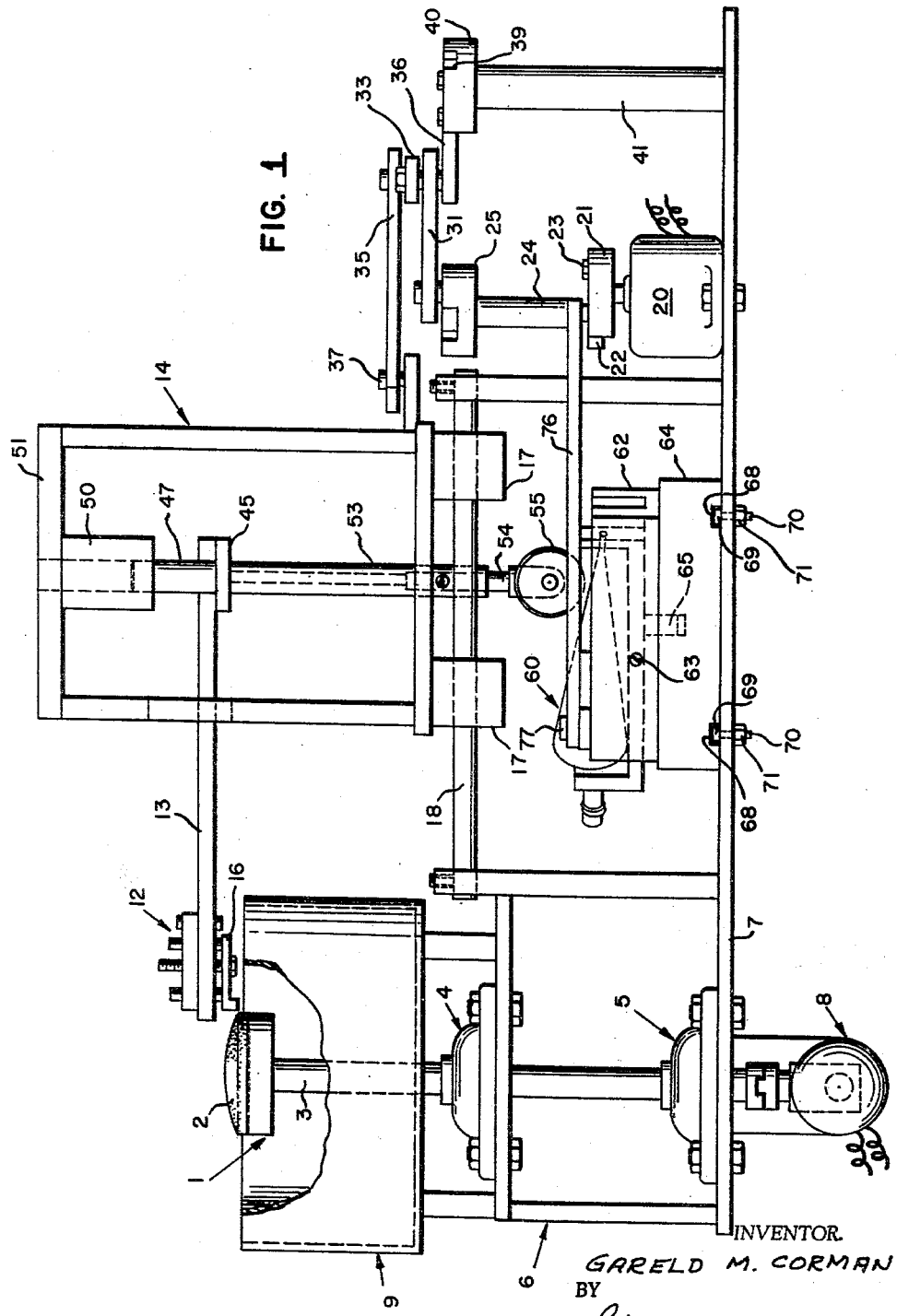
FIG. 1 is a side elevation of the machine partly broken away and in section to show structure.
Figure 2:
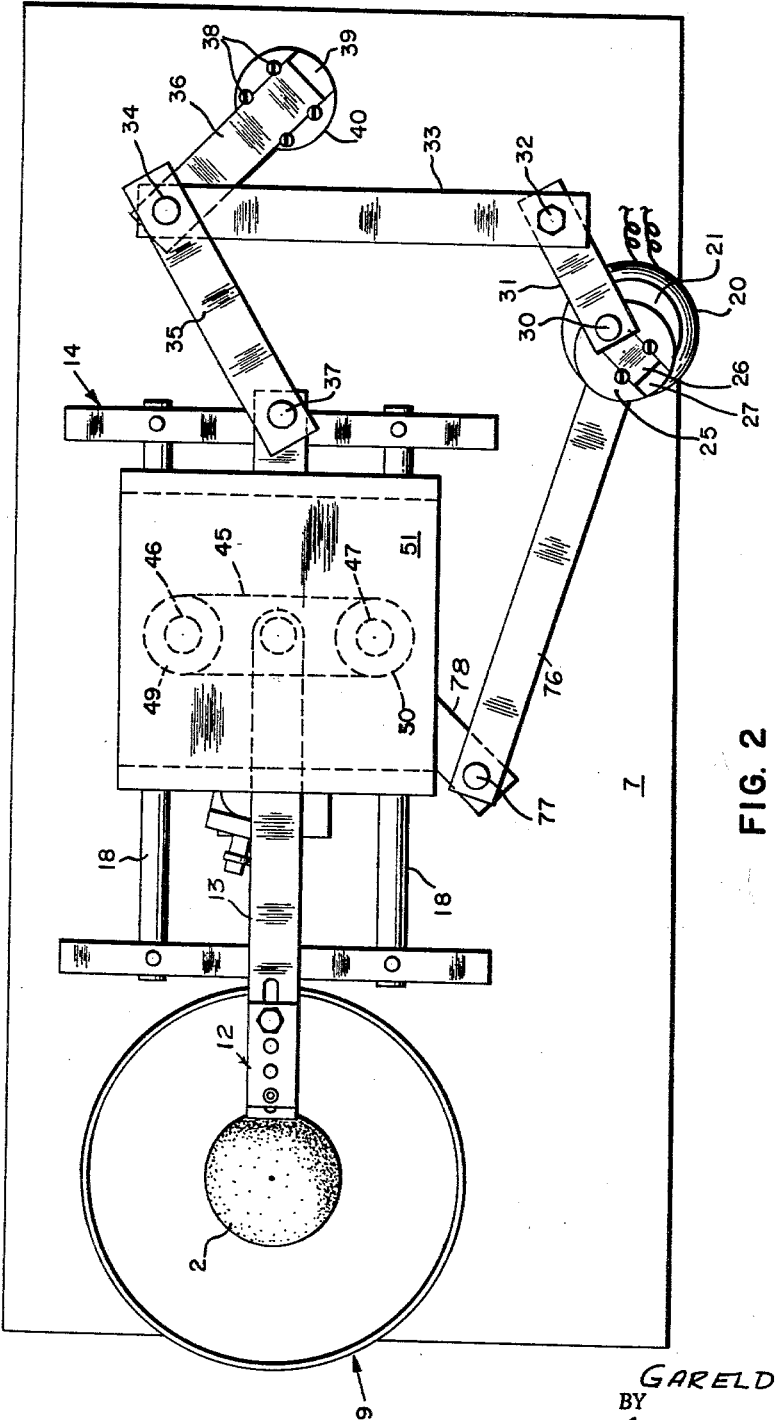
FIG. 2 is a top plan view of the machine.

In detail, and first with reference to FIGS. 1 and 2 a work holder generally designated 1 and adapted to receive a lens blank 2 thereon is supported on a vertically extending shaft 3 which is rotatable on upper and lower bearings 4, 5 respectively. Said bearings are suitably supported on a frame generally designated 6. Said frame 6 includes a lower base plate 7 to the underside of which is mounted a motor 8 and which is provided with a right angle drive on its output shaft for rotating shaft 1. The work holder 1 is preferably provided with a surrounding pan 9 adapted to receive the abrasive and other particles thrown off during the grinding operation. A tool holder generally designated 12 is provided on one end of a support plate 13 which is secured at its opposite end within a feed carriage generally designated 14.

As will subsequently be understood, the carriage 14 is reciprocated along a path of travel in a plane of the vertical axis of the shaft 3 and radially of said axis so that as the work rotates the tool 16 supported on the tool holder 12 engages the surface of the work thereby grinding it to a surface of revolution.

The carriage 14 is supported by means of four bearings 17 on a pair of horizontally extending rods 18 which in turn are suitably supported on a frame 6. Reciprocation of carriage 14 is effected by a linkage best seen in FIG. 2. Said linkage is driven by a motor 20 the output shaft of which is provided with a disk 21 diametrally slotted to receive a slide 22 which may be adjustably secured in any desired position relative to the disk 21 by bolt 23. Secured at its lower end to the slide 22 is an upwardly extending shaft 24 which is provided at its upper end with a disk 25 similar to disk 21 and provided with a slide 26 reciprocably received within slot 27.

Slide 26 is provided with an upwardly extending pin 30 to which is pivotally secured a horizontal extending link 31 fixedly secured as by bolt 32 to one end of a relatively long link 33. The opposite end of link 33 is provided with a pin 34 to which are pivotally secured adjacent ends of links 35, 36. The opposite end of link 35 is pivotally supported on a pin 37 carried by the carriage 14. The end of link 36 opposite pin 34 is adjustably but fixedly secured by screws 38 within a slot 39 formed on the upper side of a disk 40 supported upwardly from base plate 7 by means of post 41.

At this point it will be apparent from FIGS. 1 and 2 that upon rotation of motor 20 the pin 30 (FIG. 2) will describe a circle moving links 35, 36 through link 33 so as to drive the carriage 14 toward and away from the central axis of the work holder shaft 3.

It will be understood that with the support plate 13 of the tool holder 12 undergoing plane reciprocation in a horizontal plane the work would be finished with an upwardly directed flat face. In order to provide the work with a predetermined contour a contour determining means is employed and will now be described.

Support plate 13 which receives the tool holder 12 at one end is connected at its opposite end to a horizontally extending plate 45 which in turn is provided with a pair of spaced apart upstanding shafts 46, 47 reciprocably received within a pair of linear bearings 49, 50 secured to the top 51 of carriage 14. Depending from the plate 45 is a hollow shaft 53 (FIG. 1) which receives within its lower end a pin 54 on which is rotatably supported a follower wheel 55 (FIGS. 1, 3).

Figure 3:
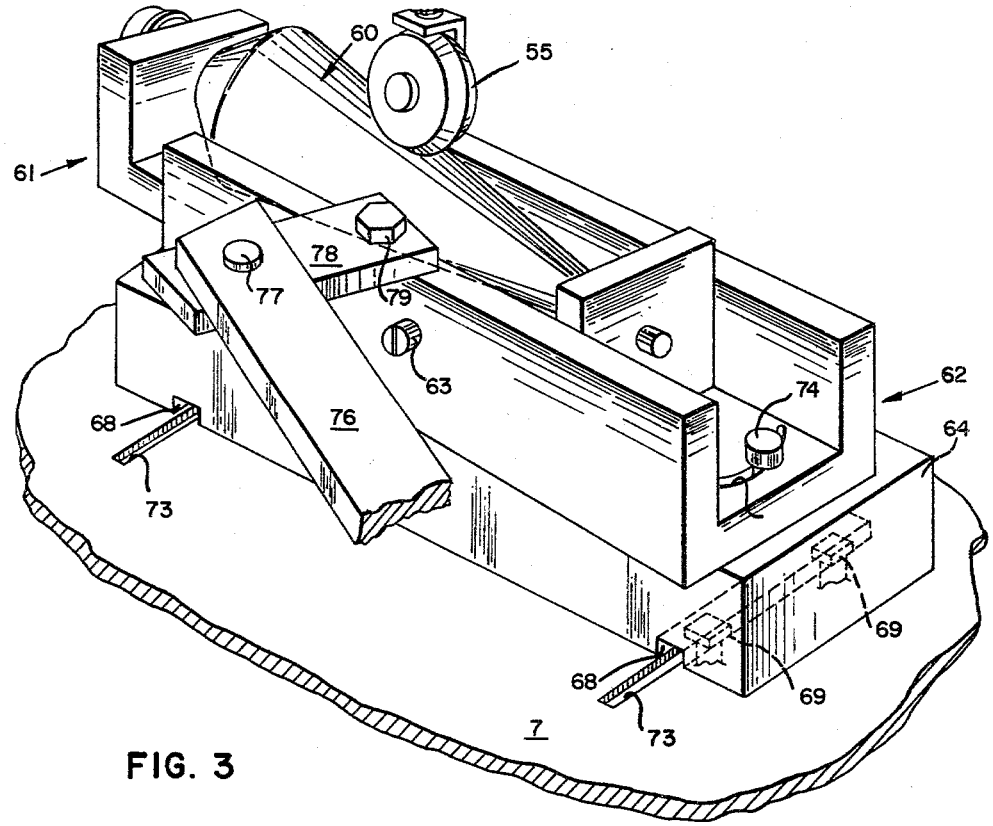
FIG. 3 is a perspective of the supporting means for the conical surface.

Referring now to FIG. 3 the wheel 55 is adapted to engage the surface of a conical template generally designated 60. This template may take the form of an actual cone in order to simplify its manufacture although only a portion of the surface of the cone is employed as a template. Said cone is mounted in any desired manner within a support 61 which in turn may be slidably received within a generally channel shaped saddle member 62. Cone support 61 may be adjustably positioned relative to saddle 62 by means of said screw 63 and saddle 62 in turn is swingably mounted relative to a base 64 by means of a downwardly extending pin 65 (FIG. 1) carried by saddle 62 and received within a complementarily formed hole in base 64. This base 64 is slidable relative to the main base 7 of the machine so as to permit securement of the base in various positions laterally relative to the path of travel of the carriage 14. This adjustment is permitted by means of a pair of downwardly opening slots 68 which are adapted to receive therein bolt head 69 of bolts 70 which may be inserted through slots 73 in base plate 7 and secured to said base plate by means of nuts 71 (FIG. 1). The cone supporting saddle 62 may be fixedly secured to the base 64 by means of set screw 74 passed through slot 75 in saddle 62 and threadedly engaging a complementarily formed hole in base 64.

It will be apparent from FIG. 3 that the saddle 62 may be adjustably secured to base 64 by means of set screw 74 so that the wheel 55 follows a parabola thereby forming the work to a paraboloid. It will be apparent that, with the adjustments provided, any conic section may be reproduced on the work simply by adjusting the cone 60 to the desired position.

By the present invention means is provided for swinging the cone 61 about the axis of pin 65 during reciprocation of the carriage 14 so as to form a surface or a revolution on the work that is neither a conic section nor a spherical surface.

Referring again to FIG. 1, an elongated link 76 is pivotally connected at one end to the shaft 24 extending between disks 21, 25. At its other end, said link 76 is pivotally supported by means of pin 77 on a short link 78 which may be fixedly secured to saddle 62 by means of bolt 79. By this structure and especially by virtue of the adjustment permitted by bolts 69 and slide 22 (FIG. 1), the saddle 62 containing the cone 60 may be swung through any desired arc during reciprocation of the carriage 14. This permits deviation in a predetermined amount to be made from the standard sections above noted. Thus, aspheric lenses may readily be formed simply by having appropriate settings of the various elements predetermined to effect the desired curve.

The above very specific description of the preferred embodiment of the invention should not be taken as restrictive thereof, since various modifications in design may be resorted to by those skilled in the art without departing from the scope of the following claims.

I claim:
1. In a machine for forming lenses and like articles:
a lens holder adapted to receive a lens thereon,
means for rotating said holder about a vertically disposed axis,
a grinding tool adapted to engage a lens blank on said holder,
a tool holder for said tool,
a carriage supporting said tool holder,
motor means for reciprocating said carriage along a horizontal path of travel perpendicular to said vertically disposed axis,
contour determining means driven by said motor means for moving said tool holder axially of said vertically disposed axis during said reciprocation,
said contour determining means including a follower wheel carried by said tool holder and a portion of a cone on which said wheel engages during said reciprocation,
linkage means connecting said portion of a cone with said motor means for swinging said portion of a cone about an axis parallel to said vertically disposed axis while engaged by said follower wheel.

2. In a machine for forming lenses and similar articles:
a work holder adapted to receive the work piece to be formed thereon,
means for rotating said holder about a central axis,
a tool adapted to engage said work,
a tool holder for said tool,
a support for said holder,
feeding means for reciprocating said support within a plane containing said central axis and along a path of travel radially of said axis,
means for moving said holder in a predetermined path of travel axially of said axis during said reciprocation,
said last mentioned means including a follower fixed relative to said holder and a conic surface on which said follower engages,
and means for swinging said conic surface about an axis parallel to said central axis while said surface is engaged by said follower.

3. A structure according to claim 2 wherein said swinging means is directly connected to said reciprocating means by an articulated linkage.

4. In a machine for forming lenses and similar articles:
a work holder adapted to receive the work piece to be formed thereon,
means for rotating said holder about an axis,
a tool adapted to engage said work,
a tool holder for said tool,
a support for said holder,
feeding means for reciprocating said support within a plane containing said axis and along a path of travel radially of said axis,
a follower connected with said holder,
a template formed with a conic surface in engagement with said follower,
a base supporting said template,
said base being swingably supported for movement above an axis parallel to the axis of said holder, and
linkage means interconnecting said base and said holder support for swinging said base upon movement of said holder support.

References Cited by the Examiner
UNITED STATES PATENTS 1,281,001 10/18 Hazel _____ 51—127 X
2,405,609 8/46 Ross _____ 51—100

J. SPENCER OVERHOLSER, *Primary Examiner.*